United States Patent [19]

Kiener

[11] 4,044,871
[45] Aug. 30, 1977

[54] HYDRAULICALLY OPERATED CLUTCH RELEASE BEARING

[75] Inventor: Heinz Kiener, Waigolshausen, Germany

[73] Assignee: SKF Industrial Trading and Development Company, B. V., Amsterdam, Holland

[21] Appl. No.: 527,363

[22] Filed: Nov. 26, 1974

Related U.S. Application Data

[63] Continuation-in-part of Ser. No. 349,456, April 9, 1973, abandoned.

[30] Foreign Application Priority Data

Apr. 13, 1972 Germany .................. 2217942

[51] Int. Cl.² .................. F16D 25/08
[52] U.S. Cl. .................. 192/91 A; 92/116; 92/DIG. 1; 192/110 B
[58] Field of Search .......... 192/82 T, 85 CA, 91 A, 192/98, 110 B; 92/116, DIG. 1

[56] References Cited

U.S. PATENT DOCUMENTS

| | | | |
|---|---|---|---|
| 2,077,292 | 4/1937 | Waseige | 192/91 A |
| 2,345,860 | 4/1944 | Scott-Iversen | 192/85 CA |
| 2,357,724 | 9/1944 | Beltz | 192/85 CA X |
| 2,402,979 | 7/1946 | Barto | 92/116 X |
| 2,674,461 | 4/1954 | Gamet | 92/116 X |
| 2,822,667 | 2/1958 | Drexel | 192/85 CA |
| 3,638,773 | 2/1972 | Lewis | 192/85 CA |

Primary Examiner—Benjamin W. Wyche

[57] ABSTRACT

A hydraulic release mechanism for automobile clutches comprising a housing open at one end and a bearing. The bearing comprises a rotating race ring adapted to be connected to the operating member of the clutch, a non-rotating race ring and a plurality of roller elements located therebetween. The non-rotating race ring is slidably arranged with respect to the housing, and seal means is arranged on the non-rotating race ring between it and the surface of the housing to enclose the housing to form a pressure chamber while permitting the race ring to move on introduction of pressurized fluid into the housing.

3 Claims, 2 Drawing Figures

U.S. Patent  Aug. 30, 1977  4,044,871

HYDRAULICALLY OPERATED CLUTCH RELEASE BEARING

RELATED APPLICATION

The present application is a continuation-in-part of Ser. No. 349,456, filed Apr. 9, 1973, now abandoned, in which Roy Peter Garrett and Derek Ray Parkins were also named co-inventors; the present application is limited to the invention shown in FIGS. 1 and 2 of that application, although reference to the entire disclosure may be made as if set forth herein.

BACKGROUND OF INVENTION

The present invention relates to a hydraulic release mechanism for clutches particularly for automobiles and similar motor vehicles.

A hydraulic release mechanism is known from German patent publication DOS No. 2,003,253. An advantage of the release mechanism when applied to a clutch arises from the fact that it may be formed as an entire assembly which can be secured by means of an annular flange on the clutch or on the transmission housing of the vehicle. In particular instances however the known release mechanism has certain disadvantages. In the known construction, the release mechanism comprises a cylindrical housing in which a bearing comprising an inner and outer ring is located. According to this construction the inner ring of the release mechanism is extended to form a piston which is axially slidable in the cylinder housing. As a result it is necessary to have an inordinate amount of room in the axial direction in order to accommodate the movement of the inner ring piston. As a result it is very difficult to employ the known release mechanisms in many motor vehicles which have limited space and in particular in those motor vehicles wherein the clutch and the transmission are set transversely to each other.

The present invention has as its object the production of a hydraulic release mechanism for motor vehicle clutches which overcomes the disadvantages of the prior art and which provides a compact constructive unit requiring very little space in the axial direction.

It is a further object of the present invention to provide a hydraulic release mechanism which may be universally used in motor vehicles and even with those employing motors transversely mounted to the direction of travel.

Further objects as well as advantages of the present invention are set forth within the body of the following disclosure of the preferred forms of the present invention.

SUMMARY OF INVENTION

According to the present invention a hydraulic release mechanism for the clutches of automobiles and similar vehicles is provided which comprises a housing open at one end and a bearing located therein. The bearing comprises a rotating race ring adapted to be connected to the operating member of the clutch through the open end of the housing, a non-rotating race ring and a plurality of roller elements located between the races. The non-rotating race ring is slidably arranged with respect to the housing and an annular seal is provided on the non-rotating race ring to seal the space between it and the housing against fluid flow to enclose the housing while permitting the race ring to move with respect to the housing on introduction of pressurized fluid into the housing. As a result of this construction the hydraulic release force for shifting the clutch, is transmitted over the non-rotating bearing ring, the roller elements, and the rotating bearing ring directly to the operating element for release of the clutch.

An advantage of the present invention lies in the fact that the entire bearing is slidable, as a piston in the housing. Since the operating element of the clutch is directly connected to the rotating race ring the space required for the entire release mechanism, in the axial direction is extremely small. Furthermore, the bearing of the release mechanism can be precisely driven with in the housing since the non-rotating race member is employed as the piston element as opposed to the prior art constructions wherein the rotating race ring is the piston element.

The open side of the housing, i.e., the side through which the operating element of the clutch passes, may be enclosed by a cover member or disc formed on the housing or the race rings. This cover disc defines with the housing a chamber in which the pressurized fluid may be introduced. When the cover disc is formed on the non-rotating ring it provides the piston head of the release bearing. The bearing itself may be formed as an angular contact bearing. The inner race ring can be provided with a bore into which the operating element can be removably secured or with which it can be integrally and unitarily formed as one piece.

Full details of the present invention are given in the following description of its preferred embodiments, and in the accompanying drawings.

Before turning to the present invention reference is made to copending application Ser. No. 349,298 filed on even date hereof corresponding to German application No. P 22 17 943.7 filed on Apr. 13, 1972 and assigned to the assignee of the present invention in which a hydraulic release mechanism is shown where the non-rotating race ring is slidable but has no play. Reference may be made to the copending application as if that application were more fully set forth herein.

DESCRIPTION OF INVENTION

Figure 1:
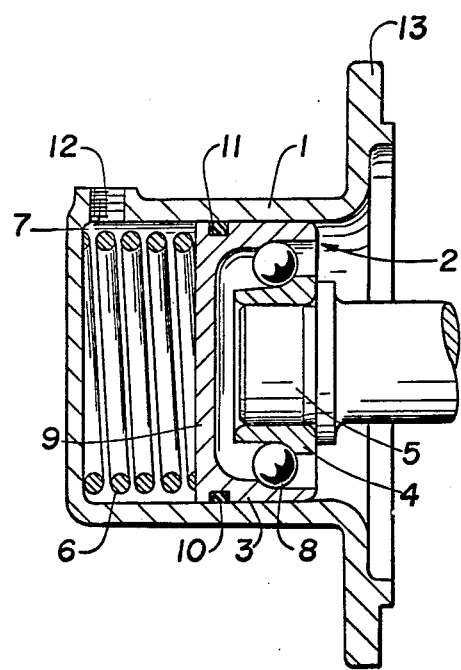
FIG. 1 is a sectional view axially through a clutch release mechanism formed in accordance with the present invention.

The release mechanism shown in FIG. 1 comprises a cylindrical housing 1. The cylindrical housing 1 is closed at its bottom end to form a cup-shaped member. A release bearing generally depicted by the numeral 2 is set within the housing. The release bearing comprises a cylindrical outer ring 3 of a slightly smaller outer diameter than the inner diameter of the housing 1 so that it slides axially within the housing with only a small amount of play. The release bearing 2 also includes an inner ring 4 into the bore of which is press fit a release element such as a rod or lever which extends outwardly of the housing and is connected to a not shown clutch. A spring 6 is arranged within the chamber 7 formed between the bottom of the housing 1 and the edge of the outer ring 3. The spring 6 normally urges the outer race ring against the plurality of roller elements 8 arranged between it and the inner race surface. The inner and outer race rings are formed with cooperating inclined surfaces acting on the roller elements, the spring 6 maintaining the race surface in constant contact with the roller elements 8. A cover member in the form of a disc 9 is integrally formed to the edges of the outer race ring located within the body of the housing and facing the bottom of the housing. The disc 9 encloses the space 7 and forms a chamber in which pressurized fluid may be received. At least one seal ring 10 located in an annular groove 11 is provided which seals the outer race ring with respect to the housing 1 so that the chamber 7 is fluid tight. A tap hole 12 extends radially through the cylindrical housing 1 into the chamber 7. The tap hole 12 is adapted to be connected by suitable conduit means to a source of fluid under pressure (not shown) and which is provided with suitable control and valve means as is known in this art. Lastly, the open end of the cylindrical housing 1 is provided with a radially extending flange 13 by which it may be fastened by suitable bolts, screws or other means to either the clutch body or transmission housing.

Operatively the release mechanism shown in FIG. 1 is such that the operating element engaging the clutch is fastened to the rotating inner race ring while the outer race ring is non-rotating with respect to the housing 1. The outer race ring 3 is, however, slidable under the combined action of the spring and pressurized fluid entering the chamber 7 so as to cause the axial movement of the entire bearing, when desired and thus the direct and instantaneous movement of the operating lever 5.

The described hydraulic release mechanism is particularly adaptable for use in friction clutches for automobiles whose motor and transmission are transversely installed with respect to the direction of travel and wherein very little room is provided in the axial direction. The cylindrical housing 1 can thereby be secured to the transmission housing and the rod like operating element can be driven through the hollow gear shaft. With this construction the release mechanism can be quickly and easily changed even under emergency situations. In order to release or shift the clutch, a pressure is fed to the chamber 7, which pressure is urged against the disc 9, moving the entire bearing assembly and the operating element to the right as seen in FIG. 1. The outer end of the operating element rod may be connected to a pressure plate by which means the disconnection of the clutch discs or comparable thrust plates may be effected.

Figure 2:
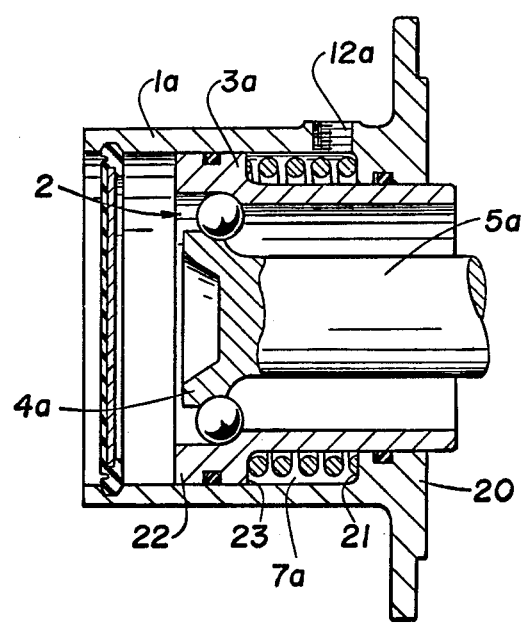
FIG. 2 is a view similar to FIG. 1 showing a second embodiment to the present invention.

In the embodiment shown in FIG. 2 a hydraulic release mechanism which is in principle similar to that of FIG. 1 is shown. However, here the release mechanism is particularly adapted to operate a "pull or draw clutch" mechanism. That is, instead of moving into the clutch mechanism to disconnect the thrust plates the operating lever 5 is withdrawn outwardly therefrom.

In the embodiment as shown in FIG. 2 a cylindrical housing 1a is provided with an inwardly directed collar 20 at one end forming a step like shoulder 21. The bearing 2 comprises an outer race ring 3a having an outwardly radially directed collar 22 which also forms a shoulder 23. The collar 22 of the outer race ring slidably engages the inner surface of the housing 1a and is integrally connected to an axially extending cylindrical member which slidably engages the inwardly directed collar 20 of the housing 1a. Both the collars 20 and 22 of the housing 1a and the outer race ring 3a respectively are provided with seal rings similar to those shown in FIG. 1. The annular space between the housing and the outer race ring defined by the shoulders 21 and 23 form pressure chamber 7a into which fluid from a pressurized source may be caused to enter via the cap 12a. The outer race ring 3a thus comprises a piston, the head of which is formed by the shoulder 23. The inner race ring 4a and the clutch operating element 5a are integrally formed as a one piece member. The inner and outer races are provided with inclined race surfaces against which the roller bearing elements are in constant contact due to the urging of the spring and the pressurized fluid located within the chamber 7a. The open end of the housing cylinder 1a is enclosed by a thin walled sealing disc seated within an annular groove which disc serves to maintain the bearing 2 free of dust and dirt and also to retain any bearing lubricant which may be provided between the inner and outer races.

To release the not shown clutch, by use of the embodiment shown in FIG. 2 the annular chamber 7a is supplied with a pressurized fluid so that its force is transmitted via the bearing assembly comprising the outer race ring, the roller bearings and the inner race ring directly to the integrally formed operating element 5a, which is moved to the left as seen in FIG. 2 withdrawing it from the not shown coupling. The combined force of the pressurized fluid and the spring within the chamber 7a creates the operating rod 5a a force sufficient to disconnect the clutch. Otherwise, the construction and operation of the release mechanism shown in FIG. 2 is that of FIG. 1.

It will be seen from the foregoing that various embodiments are provided in which a hydraulic release mechanism for clutches, particularly for clutches used in motor vehicles, is simply and easily formed and which have multiple uses and advantages. The release mechanism in each embodiment is such that the hydraulic release force is transmitted unlike the prior art, over the non-rotating bearing race ring, via the roller elements, to the rotating bearing race ring on which or to which the release element of the clutch element is secured. In this manner the release mechanism is compactly made and take up only a very small axial space. Furthermore, the entire arrangement can be made as a unit which may be directly secured to the clutch or the transmission housing as desired. Particularly the construction as shown can be used in those vehicles wherein the motor and the transmission are installed transversely to the direction of travel. In such instances the operating element 5 can be connected either to an operating lever in the coupling itself or through a connecting rod extending through the transmission to the clutch to operate the same. It will also be seen that the release mechanism of the present invention is adaptable both for the push type clutches as well as for the pull or draw type clutches. The present invention may also be used in connection with the more conventional construction of motor vehicles wherein the clutch is arranged between the motor and the transmission so that the drive shaft is driven extendingly through the clutch and the release mechanism.

Only a very minor and insignificant modification of the structures shown and described above need be made, without departing from the scope and framework of the present invention. If also desired, the present invention provides a release mechanism which is particularly adapted for motors which are transversely installed. The drive moment can be transmitted from the clutch lateraly to a transmission which is arranged under or near the motor.

Various modifications, changes and embodiments have been shown in the present disclosure. The present disclosure is intended to be illustrative only of the present invention and not to be limiting of its scope in any manner.

What is claimed is:

1. A hydraulic release mechanism for automobile clutches and the like comprising:

a cylindrical housing open at one end thereof to receive the operating member of a clutch and having inlet means therein adjacent an end thereof for the introduction of pressurized fluid thereinto;

a bearing located entirely and concentrically within said housing including a rotatable inner race ring adapted to be connected to the operating member of the clutch and a separable non-rotatable outer race ring one axial end of which defines with inner surfaces of said housing a pressure chamber for the pressurized fluid;

a plurality of roller elements located between said inner and outer race rings;

said non-rotatable outer race ring having the radially outer wall surface thereof in direct axially slidable engagement with the inner surface of said housing;

spring means located within said pressure chamber in engagement with said one axial end of said outer race ring and biasing same towards the other end of said housing so as to maintain said roller elements in operative engagement with the cooperable surfaces of said inner and outer race rings;

and seal means interposed between the said inner surfaces of the housing and said radially outer wall surface of the non-rotatable race ring to circumferentially enclose the same and to permit said outer race ring and said bearing to move axially within said housing on introduction of pressurized fluid into said housing.

2. The release mechanism according to claim 1, including a cover disc integral with said outer race ring and constituting said axial end thereof.

3. The release mechanism according to claim 1 wherein said seal nmeans comprises a ring set within a groove formed in the outer wall of said outer race ring and is slidable conjointly therewith with respect to the adjacent surface of said housing.

* * * * *